Dec. 4, 1923.					1,476,276
H. WITZ
SEALING DEVICE FOR TRAVELING GRATE FURNACES
Filed Dec. 21, 1922
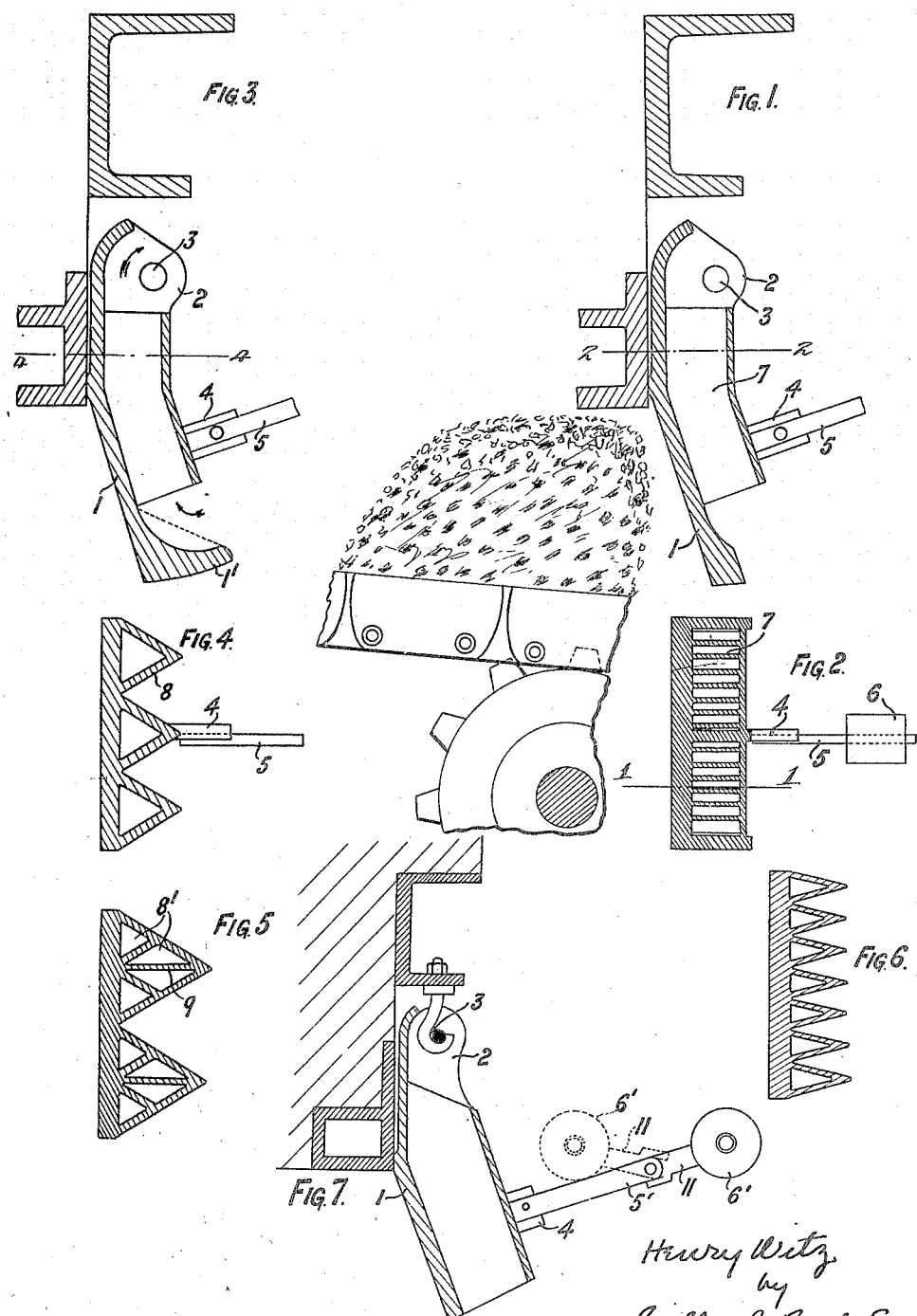

Patented Dec. 4, 1923.

1,476,276

UNITED STATES PATENT OFFICE.

HENRY WITZ, OF OBERHAUSEN, GERMANY, ASSIGNOR TO BABCOCK & WILCOX COMPANY, OF NEW YORK, N. Y.

SEALING DEVICE FOR TRAVELING-GRATE FURNACES.

Application filed December 21, 1922. Serial No. 608,199.

*To all whom it may concern:*

Be it known that I, HENRY WITZ, a citizen of the German Empire, and resident of Oberhausen, Rhineland, Germany, have invented a certain new and useful Improvement in and Connected with Sealing Devices for Traveling-Grate Furnaces.

This invention relates to improvements in and connected with rocking ash or clinker collecting and air-sealing devices, for use at the rear of a traveling grate, and has for an object to provide an improved construction of such devices.

Several embodiments of the invention are illustrated in the accompanying drawing, in which Fig. 1 is a vertical section along the line 1—1 of Fig. 2, and shows a portion of the grate in position with the fuel thereon, Fig. 2 is a horizontal section along the line 2—2 of Fig. 1 showing one embodiment; Fig. 3 is a view similar to Fig. 1 but showing a slightly modified form; Fig. 4 is a horizontal section along the line 4—4 of Fig. 3; Figs. 5 and 6 each show a modified construction of the cooling ducts, each view being in horizontal section; Fig. 7 is a view corresponding to Figs. 1 and 3 but showing an arrangement for varying the torque applied to the device for maintaining it in position.

In the embodiment illustrated in Figs. 1 and 2, 1 denotes the body of the device, which is provided at the upper end with three cheeks 2, having holes 3, through which extends the spindle on which the device is mounted to rock. The central cheek has a lug 4, to which is fitted a rod 5 carrying an adjustable loading weight 6.

The rear side of the device is provided with a large number of comparatively thin, but wide, ribs 7, which extend from top to bottom and at the rear edges are connected with one another so that ducts are formed. In consequence, the rear of the device presents a very large superficial area, several times that of the heated surface; the air contained in the ducts thus formed is heated, rises upwards and draws behind it cool air which cools the walls of the ducts. The ducts, therefore, act like a chimney, so that an automatic suction of air takes place.

In the embodiment illustrated in Figs. 3 and 4, the lower part of the body of the device is provided with an extension 1' facing rearward in the form of a shoe, the upper side of which merges into the rear wall. On the rear wall and cast integrally therewith are ducts 8, closed at the sides and open at top and bottom, said ducts being of triangular form in cross-section, the apex being directed towards the rear. These ducts function also after the manner of a chimney, since the air contained in them becomes heated and produces a draught, so that fresh air is continually being brought into contact with the walls of the ducts and satisfactory removal of heat is assured. The alteration in the direction of the current of air entering the ducts is especially advantageous, as thereby effective cooling of the extension 1' is ensured. The extension 1' may also be ribbed, as indicated by the dotted line, and in this way the cooling action is considerably increased.

In the embodiment illustrated in Fig. 5 several ducts 8' are provided one behind the other with intermediate walls 9 which increase the surface adapted to dissipate the heat.

In the embodiment shown in Fig. 6 the ducts are arranged at a more acute angle, so that they approach the cross-sectional form of radiators and offer a very large cooling surface.

In the embodiment shown in Fig. 7 the weight 6' is arranged on a lever arm 11 pivoted to rod 5'. This arrangement permits the weight 6' to be swung from the dotted position into the position shown in full lines, so that the device may be easily loaded for forced working when desired.

I claim :—

1. An ash and clinker collecting and air sealing device for traveling grates for furnaces consisting of a metallic body mounted for rocking movement at the rear of the grate, said body having a plurality of substantially vertical ducts integral with said body and located on the side remote from the furnace, said ducts being open at the top and the bottom, whereby a defined circulation of cooling air is established through said ducts by the heat of the furnace.

2. An ash and clinker collecting and air sealing device for traveling grates for furnaces consisting of a metallic body mounted for rocking movement at the rear of the grate, said body having a plurality of substantially vertical ducts of triangular cross section, said ducts being integral with said body and located on the side remote from the furnace, said ducts being open at the top and the bottom, whereby a defined circulation of cooling air is established through said ducts by the heat of the furnace.

3. An ash and clinker collecting and air sealing device for traveling grates for furnaces, consisting of a metallic body mounted for rocking movement at the rear of the grate, said body having a plurality of substantially vertical ducts integral with said body and located on the side remote from the furnace, said ducts being open at the top and the bottom, the lower edge of said body having a rearward extension, whereby a defined circulation of cooling air is established through said ducts by the heat of the furnace.

4. An ash and clinker collecting and air sealing device for traveling grates for furnaces consisting of a metallic body mounted for rocking movement at the rear of the grate, said body having a plurality of substantially vertical ducts integral with said body and located on the side remote from the furnace, said ducts being open at the top and the bottom, whereby a defined circulation of cooling air is established through said ducts by the heat of the furnace, and means for loading said body.

5. An ash and clinker collecting and air sealing device for traveling grates for furnaces consisting of a metallic body mounted for rocking movement at the rear of the grate, said body having a plurality of substantially vertical ducts integral with said body and located on the side remote from the furnace, said ducts being open at the top and the bottom, whereby a defined circulation of cooling air is established through said ducts by the heat of the furnace, and means for adjustably loading said body.

HENRY WITZ.